United States Patent [19]
Kienzle et al.

[11] 4,346,589
[45] Aug. 31, 1982

[54] FLOW RATE METER

[75] Inventors: Wolfgang Kienzle; Werner Paschke, both of Schwieberdingen; Erwin Nägele, Hessigheim, all of Fed. Rep. of Germany

[73] Assignee: Robert Bosch GmbH, Stuttgart, Fed. Rep. of Germany

[21] Appl. No.: 188,437

[22] Filed: Sep. 19, 1980

[30] Foreign Application Priority Data

Nov. 3, 1979 [DE] Fed. Rep. of Germany ....... 2944469

[51] Int. Cl.$^3$ ................................................ G01F 1/28
[52] U.S. Cl. .................................... 73/118; 73/861.76
[58] Field of Search ........... 73/861.74, 861.75, 861.76, 73/118; 123/452, 494

[56] References Cited

U.S. PATENT DOCUMENTS

| | | | |
|---|---|---|---|
| 3,728,993 | 4/1973 | Eckert et al. | 123/452 |
| 3,915,138 | 10/1975 | Eckert et al. | 123/452 X |
| 4,184,466 | 1/1980 | Nagele | 73/861.74 |
| 4,227,507 | 10/1980 | Takase et al. | 123/494 X |

Primary Examiner—Herbert Goldstein
Attorney, Agent, or Firm—Edwin E. Greigg

[57] ABSTRACT

A flow rate meter is proposed which serves to ascertain the quantity of a flowing medium particularly the quantity of air aspirated by an internal combustion engine via an air intake tube. The flow rate meter includes a measuring device pivotable in a flow channel about a support shaft downstream of which measuring device the flow channel is suddenly enlarged at several zones in order to reduce the measurement error at a maximal flow rate of the medium.

3 Claims, 2 Drawing Figures

FLOW RATE METER

BACKGROUND OF THE INVENTION

The invention relates to a flow rate meter as described herein. A flow rate meter is already known but in which the characteristic curve of the flow rate meter can be affected only to a limited extent, or at relatively great expense, by the selection of the contour of the flow channel. Particularly when the flow rate meter is used in a motor vehicle at full load, there is a relatively large amount of error in positioning of the flow rate meter, which translated into a large error in flow rate measurement.

OBJECT AND SUMMARY OF THE INVENTION

The flow rate meter according to the invention has the advantage over the prior art that a further opportunity is afforded for affecting the characteristic curve of the flow rate meter and for reducing the measurement error, particularly in the presence of high flow rates of the medium being measured—in other words, when the flow rate meter is used in a motor vehicle, in the full-load engine range.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
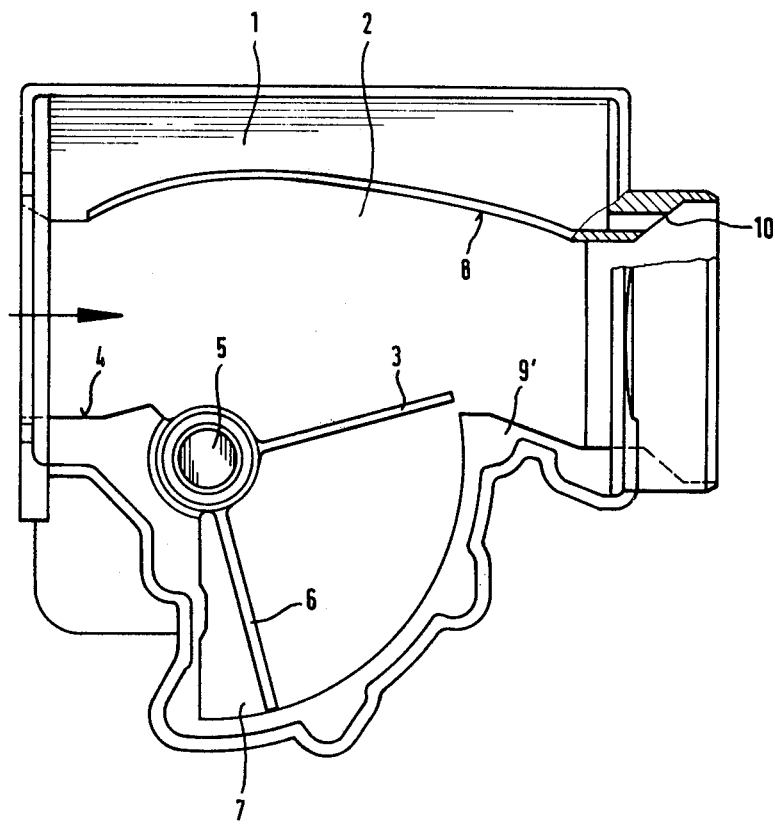
FIG. 1 shows a section through flow rate meter whose general structure is known.
Figure 2:
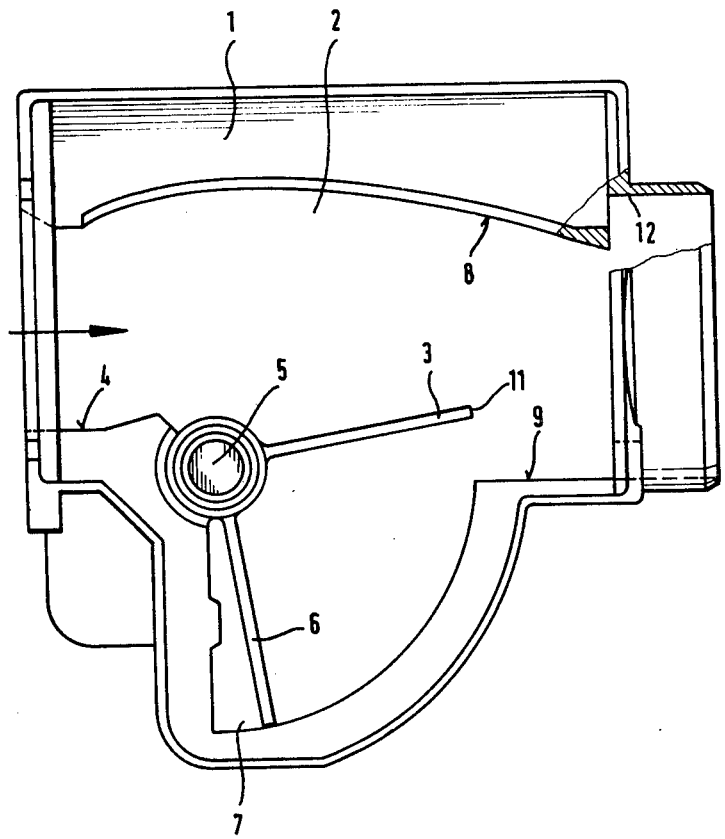
FIG. 2 shows also a section through flow rate meter embodied in accordance with the invention.

In the flow rate meters shown by way of example in FIGS. 1 and 2, the quantity of air aspirated, by way of example, by an internal combustion engine via an air intake tube flows in the direction of the arrow through a flow channel 2 in a housing 1, the flow channel having a measuring valve 3 serving as the flow rate meter, to the individual cylinders, not shown, of the engine. The measuring valve 3 is supported to rotate about a support shaft 5 in such a manner as to be pivotable to one side in the vicinity of one wall 4 of the flow channel 2. By means of the appropriate support of the measuring valve 3 on the support shaft 5 via ball bearings, not shown, the pivoting movement of the measuring valve 3 is performed virtually free of friction. For the specialized application of the flow rate meter in the air intake tube of an internal combustion engine, it is efficient to connect a damping valve 6 with the measuring valve 3 in order to damp pulses which may occur. The damping valve 6 is also disposed about the support shaft 5 so as to be pivotable within a damping chamber 7. The deflection of the measuring valve 3 caused by the incoming flow of air is effected, by way of example, counter to the spring force of a spiral spring engaging the support shaft 5 but not shown in the drawings. The angular position of the measuring valve 3 or of the support shaft 5 may be picked up electrically, for instance, via a potentiometer as a standard for the rate of air flowing past it. In the drawing, the measuring valve 3 is shown in its operating position with a nearly maximal flow rate.

The characteristic curve of the flow rate meter shown, which is characterized by the angular position of the measuring valve 3 in accordance with the aspirated air quantity, takes an exponential course. For evaluating the measurement product of the flow rate meter it may be desirable to influence this course in certain areas. Various opportunities to do so are provided by varying the spring force, which acts as a restoring force, or by the selection of the course of the wall 8 defining the flow channel 2 and located opposite the support shaft 5 and of the course of the wall 9 downstream of the measuring valve 3 on the support shaft side.

In the known air flow rate meter shown in FIG. 1, the flow channel wall 9' on the support shaft side directly downstream of the measuring valve 3, when the measuring valve 3 is in a position characterizing maximum flow, continues on in virtually the same plane in which the measuring valve 3 is located in this operational state. In like fashion, the flow channel wall 8 downstream of the effective range of the measuring valve 3 is enlarged only gradually.

It has now been demonstrated that the measurement error of the flow rate meter at a maximum flow rate—that is, when the flow rate meter is used in a motor vehicle in the full-load range of the engine—can be very significantly reduced when the flow channel 2 is suddenly greatly enlarged downstream of the measuring valve 3. This can be done, first, by giving the flow channel wall 9 located on the support side a course immediately downstream of the measuring valve 3 such that, in the position of the measuring valve 3 characterizing a maximal flow rate of the medium, the flow channel wall 9, opposite the end 11 pointing in the flow direction of the measuring valve 3, is offset, which greatly enlarges the flow channel 2. Second, it is efficient to provide the flow channel wall 8 opposite the bearing side and downstream of the effective range of the flow rate meter with a step 12, which again causes a sudden great increase in width of the flow channel 2. The simultaneous embodiment of the flow channel 2 with the widened flow channel wall 9 and the step 12, in particular, causes the measurement error of the measuring valve 3 at maximal flow rates to be less than six percent, while the error at maximal fow rates in the known flow rate meter shown in FIG. 1 is approximately thirty percent.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A flow rate meter having a housing and an air medium flow measuring device disposed in a flow channel between an inlet end and an outlet end, said measuring device being pivotable about a support shaft in accordance with the quantity of air medium flowing therethrough and counter to a restoring force, said measuring device arranged to measure the quantity of air medium aspirated by an internal combustion engine via an air intake tube, characterized in that said flow channel has a first abruptly enlarged cross section immediately downstream of said measuring device and a second abruptly enlarged cross section adjacent said outlet end downstream of said first abruptly enlarged cross section in order to influence the characteristic curve of the flow rate meter.

2. A flow rate meter as defined by claim 1, characterized in that said measuring device is supported at one side on a wall of said flow channel and said flow channel wall immediately downstream of said air measuring device is such that at a position of the measuring device which characterizes the maximal fow rate of the medium, said wall directly opposite the end of said air flow measuring device pointing in the flow direction is abruptly offset relative to said outlet end thereby greatly enlarging the flow channel immediately adjacent said air flow measuring device.

3. A flow rate meter as defined by claim 1, characterized in that said measuring device is supported at one side on said flow channel wall and said flow channel wall located opposite the support side has a step adjacent said output end of said channel downstream of the effective range of the measuring device, said step causing a sudden enlargement adjacent the output end of said flow channel.

* * * * *